(12) United States Patent
Yu

(10) Patent No.: US 11,082,613 B2
(45) Date of Patent: Aug. 3, 2021

(54) IMAGE ADJUSTING METHOD AND IMAGE ADJUSTING DEVICE

(71) Applicant: Realtek Semiconductor Corporation, Hsinchu (TW)

(72) Inventor: Teng-Hsiang Yu, New Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 202 days.

(21) Appl. No.: 16/415,261

(22) Filed: May 17, 2019

(65) Prior Publication Data
US 2020/0154039 A1 May 14, 2020

(30) Foreign Application Priority Data
Nov. 8, 2018 (TW) ................. 107139717

(51) Int. Cl.
*H04N 5/232* (2006.01)
*G06N 20/20* (2019.01)
*G06T 7/70* (2017.01)
*H04N 5/57* (2006.01)
*G06T 9/00* (2006.01)

(52) U.S. Cl.
CPC ......... *H04N 5/23229* (2013.01); *G06N 20/20* (2019.01); *G06T 7/70* (2017.01); *G06T 9/002* (2013.01); *H04N 5/57* (2013.01)

(58) Field of Classification Search
None
See application file for complete search history.

(56) References Cited

U.S. PATENT DOCUMENTS

| 7,283,654 | B2* | 10/2007 | McLain | G06T 5/009 |
| | | | | 382/128 |
| 8,224,108 | B2* | 7/2012 | Steinberg | H04N 5/23299 |
| | | | | 382/255 |
| 10,477,095 | B2* | 11/2019 | Zhang | A61B 5/442 |
| 2002/0036783 | A1* | 3/2002 | Yoshidome | H04N 1/60 |
| | | | | 358/1.9 |
| 2004/0212680 | A1* | 10/2004 | Schroeder | G02B 7/365 |
| | | | | 348/188 |
| 2005/0254725 | A1* | 11/2005 | Nishi | G06T 5/005 |
| | | | | 382/275 |
| 2006/0072799 | A1* | 4/2006 | McLain | G06T 5/40 |
| | | | | 382/128 |

(Continued)

FOREIGN PATENT DOCUMENTS

JP  2000293679 A  10/2000

*Primary Examiner* — Anand P Bhatnagar
(74) *Attorney, Agent, or Firm* — Locke Lord LLP; Tim Tingkang Xia, Esq.

(57) ABSTRACT

An image adjusting method includes: detecting objects in an input image and classifying the objects through a deep learning model, thereby obtaining at least one category included in the input image, a weight value corresponding to each of the categories, and at least one block of the input image corresponding to each of the categories; obtaining a color information and a coordinate information of each of the blocks; and adjusting at least one of the sharpness, dynamic contrast control (DCC), and independent color management (ICM) of each of the block of the input image according to the weight value, the coordinate information, and the color information corresponding to each of the blocks, thereby generating an output image.

20 Claims, 4 Drawing Sheets

(56) References Cited

U.S. PATENT DOCUMENTS

| | | | | |
|---|---|---|---|---|
| 2012/0120304 A1* | 5/2012 | Corcoran | ............. | G06F 16/784 |
| | | | | 348/349 |
| 2013/0321675 A1* | 12/2013 | Cote | ..................... | H04N 9/045 |
| | | | | 348/242 |
| 2019/0130538 A1* | 5/2019 | Zeng | .................. | G06K 9/00248 |
| 2020/0351460 A1* | 11/2020 | Cote | .................. | H04N 9/04517 |

* cited by examiner

IMAGE ADJUSTING METHOD AND IMAGE ADJUSTING DEVICE

RELATED APPLICATIONS

This application claims priority to Taiwan Application Serial Number 107139717, filed Nov. 8, 2018, which is herein incorporated by reference.

BACKGROUND

Field of Invention

The present invention relates to an image adjusting method. More particularly, the present invention relates to an image adjusting method and an image adjusting device for adjusting sharpness, dynamic contrast control (DCC), and/or independent color management (ICM) of an input image.

Description of Related Art

In the optimization process of the visual quality of the image, the adjustment of sharpness, dynamic contrast control (DCC), and/or independent color management (ICM) of the image are important steps for image enhancement. In general, the original image is adjusted to enhance the color performance of the image, thereby improving the visual quality of the image. However, the adjusting levels required for different blocks of the image are usually not the same. If the entire image is adjusted directly during the image enhancement process, the adjustment result of the image may not be as expected.

SUMMARY

The present invention provides an image adjusting method. The image adjusting method includes: detecting objects in an input image and classifying the objects through a deep learning model, thereby obtaining at least one category included in the input image, a weight value corresponding to each of the categories, and at least one block of the input image corresponding to each of the categories; obtaining a color information and a coordinate information of each of the blocks; and adjusting at least one of the sharpness, dynamic contrast control (DCC), and independent color management (ICM) of each of the block of the input image according to the weight value, the coordinate information, and the color information corresponding to each of the blocks, thereby generating an output image.

The present invention further provides an image adjusting device including an image capturing device and an image processing module. The image capturing device is configured to capture an input image. The image processing module is electrically connected to the image capturing device. The image processing module is configured to perform the following steps: detecting objects in the input image and classifying the objects through a deep learning model, thereby obtaining at least one category included in the input image, a weight value corresponding to each of the categories, and at least one block of the input image corresponding to each of the categories; obtaining a color information and a coordinate information of each of the blocks; and adjusting at least one of the sharpness, dynamic contrast control (DCC), and independent color management (ICM) of each of the block of the input image according to the weight value, the coordinate information, and the color information corresponding to each of the blocks, thereby generating an output image.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size.

Figure 1:
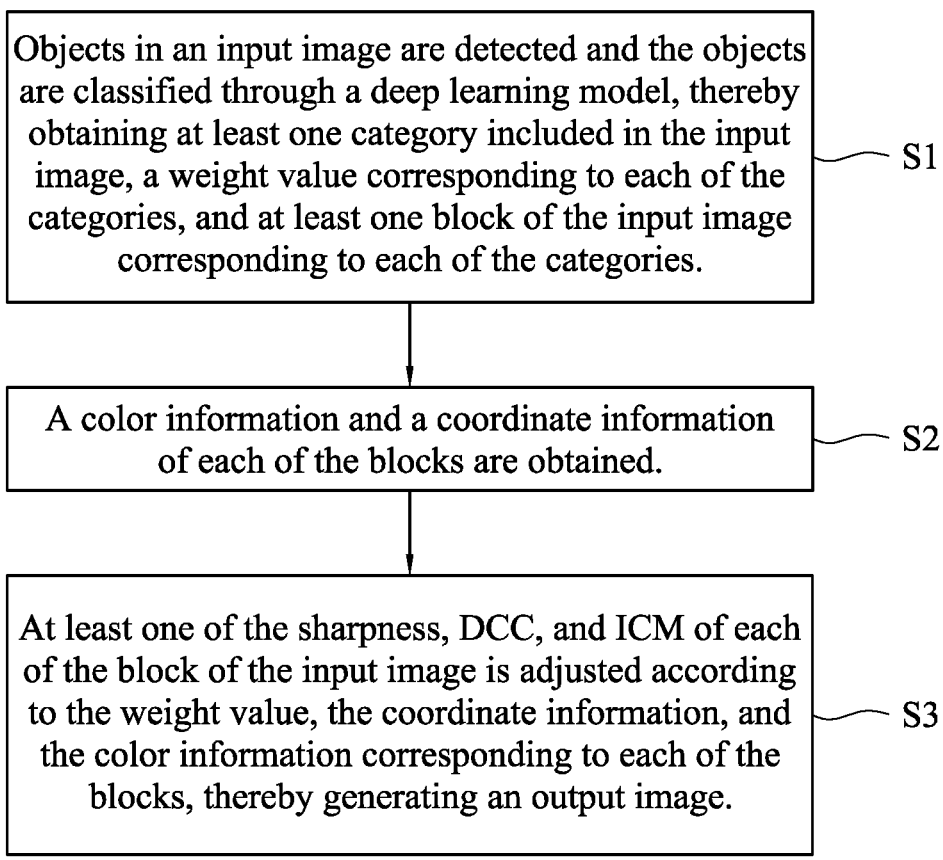
FIG. 1 illustrates a flow chart of an image adjusting method according to an embodiment of the present invention.

FIG. 1 illustrates a flow chart of an image adjusting method according to an embodiment of the present invention. In step S1, objects in an input image are detected and the objects are classified through a deep learning model, thereby obtaining at least one category included in the input image, a weight value corresponding to each of the categories, and at least one block of the input image corresponding to each of the categories.

In the embodiment of the present invention, the deep learning model uses artificial intelligence (AI) technology to perform learning on a large number of specific images in advance by neural network that imitates human brain, thereby performing object detection and classification by using the trained deep learning model. The deep learning model is configured to recognize at least one object included in the input image and identify at least one category (e.g., human face) of the object. In the embodiment of the present invention, the weight value represents the proportion of one of the categories. For example, if the input image includes a first category and a second category, the sum of a first weight value corresponding to the first category and a second weight value corresponding to the second category is 1.

Referring to FIG. 1, in step S2, a color information and a coordinate information of each of the blocks are obtained. In the embodiment of the present invention, the color information of each of the blocks corresponds to a color value which appears most often among plural color values of plural pixels of each of the blocks. For example, if the color values corresponds to the YUV format, the Y value which appears most often among plural Y values of plural pixels of each of the blocks is represented as $Y_{max}$; the U value which appears most often among plural U values of plural pixels of each of the blocks is represented as $U_{max}$; the V value which appears most often among plural V values of plural pixels of each of the blocks is represented as $V_{max}$; and the color information is represented as $Y_{max}U_{max}V_{max}$. In the embodiment of the present invention, the coordinate information of each of the blocks corresponds to a coordinate value of a top-left corner of each of the blocks and a coordinate value of a bottom-right corner of each of the blocks. In addition, the coordinate information of each of the blocks may correspond to a coordinate value of the center of each of the blocks and the width and the height of each of the blocks. The coordinate information is configured to represent the position information from the top-left corner to the bottom-right corner of the input image.

Referring to FIG. 1, in step S3, at least one of the sharpness, dynamic contrast control (DCC), and independent color management (ICM) of each of the block of the input image is adjusted according to the weight value, the coordinate information, and the color information corresponding to each of the blocks, thereby generating an output image. Details of the adjustment of the sharpness, DCC, and ICM will be further stated below.

Figure 2:
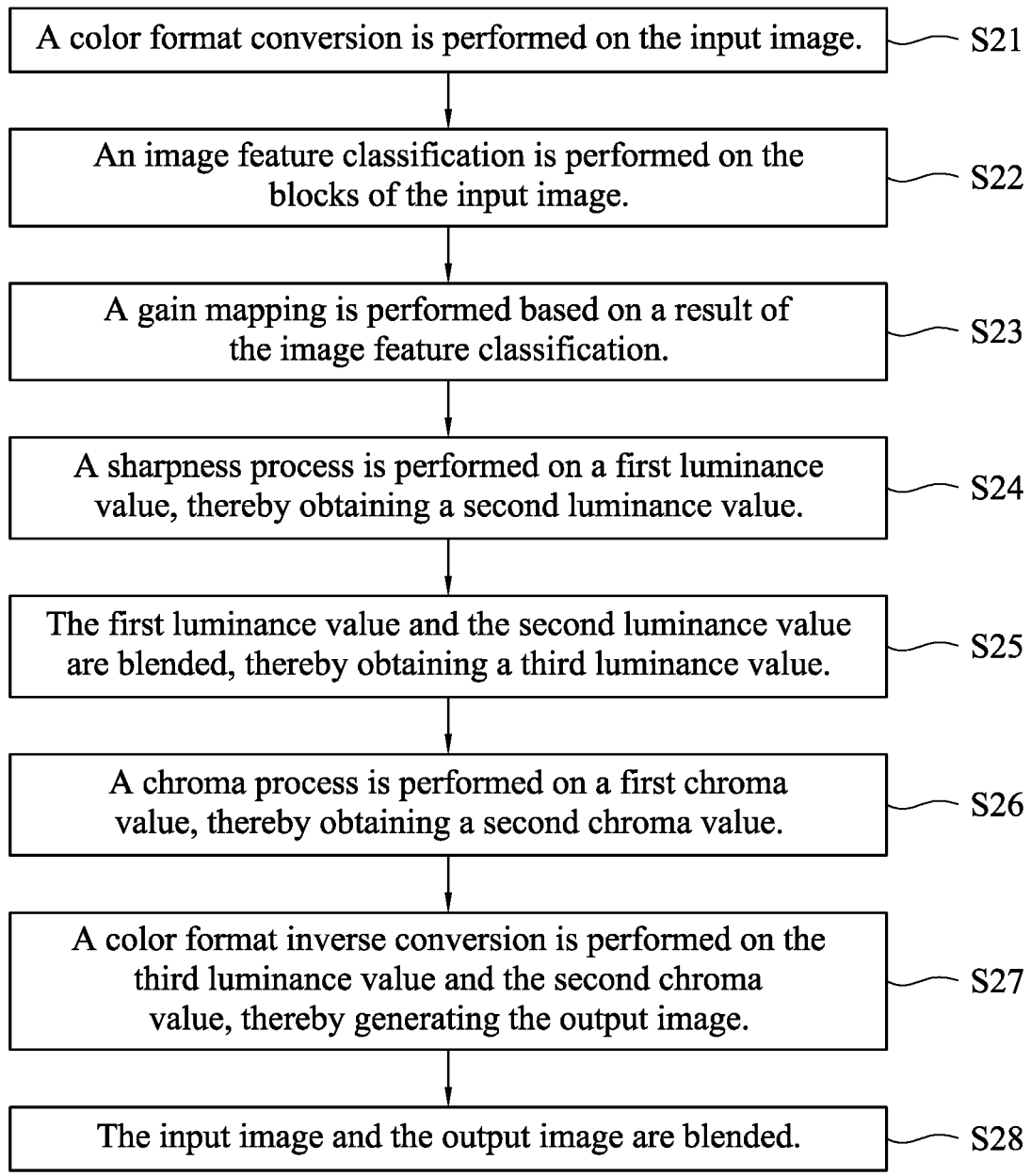
FIG. 2 illustrates a flow chart of a method for adjusting the sharpness of the input image according to the embodiment of the present invention.

FIG. 2 illustrates a flow chart of a method for adjusting the sharpness of the input image according to the embodiment of the present invention. In step S21, a color format conversion is performed on the input image. In the embodiment of the present invention, the color format conversion of step S21 is to convert the RGB color format to the YUV color format, but the present invention is not limited thereto. In step S22, an image feature classification is performed on the blocks of the input image. In step S23, a gain mapping is performed based on a result of the image feature classification. In the embodiment of the present invention, the image feature classification is configured to classify each of the blocks of the input image according to a flat portion, an edge portion, and a texture portion based on the Y value (i.e., the luminance value) of the color value, and then the gain mapping is performed based on the result of the image feature classification.

In step S24, a sharpness process is performed on the Y value (hereinafter referred to as a first luminance value) of the color value corresponding to the pixels of each of the blocks of the input image, thereby obtaining a second luminance value corresponding to the pixels of each of the blocks of the input image. In step S25, the first luminance value and the second luminance value corresponding to the pixels of each of the blocks of the input image are blended according to a result of the gain mapping, the weight value, the coordinate information, and the color information corresponding to each of the blocks, the corresponding to each of the blocks, thereby obtaining a third luminance value corresponding to the pixels of each of the blocks of the input image. In the embodiment of the present invention, a proportion of the first luminance value and a proportion of the second luminance value during the blending process are calculated according to the result of the gain mapping, and the weight value, the coordinate information, and the color information corresponding to each of the blocks. For example, the first luminance value is $Y_1$, and the proportion of the first luminance value during the blending process is $W_1$, and the second luminance value is $Y_2$, and the proportion of the second luminance value during the blending process is $W_2$, and then the third luminance value is $Y_1*W_1+Y_2*W_2$.

In step S26, a chroma process is performed on the U value and the V value (hereinafter referred to as a first chroma value) of the color value corresponding to the pixels of each of the blocks of the input image, thereby obtaining a second chroma value corresponding to the pixels of each of the blocks of the input image. In step S27, a color format inverse conversion is performed on the third luminance value and the second chroma value corresponding to the pixels of each of the blocks of the input image, thereby generating the output image. In the embodiment of the present invention, the color format inverse conversion in step S27 is opposite to the color format conversion in step S21, for example, the color format inverse conversion is to convert the YUV color format to the RGB color format, but the present invention is not limited thereto.

In step S28, the input image and the output image are blended according to the weight value, the coordinate information, and the color information corresponding to each of the blocks, so that the color of the output image and the color of the input image are not differ too much to cause negative side effect. The purpose of step S28 is to protect several specific blocks of the output image, so that the color of output image can be more natural.

In the embodiment of the present invention, it is noted that with respect to a degree of adjustment of the sharpness of each of the blocks of the input image, the center of each of the blocks of the input image is adjusted more than the edge of each of the blocks of the input image. In other words, the degree of adjustment of the sharpness of the center of each of the blocks of the input image is highest, and the degree of adjustment is decreased from the center of each of the blocks of the input image toward the edge of each of the blocks of the input image.

Figure 3:
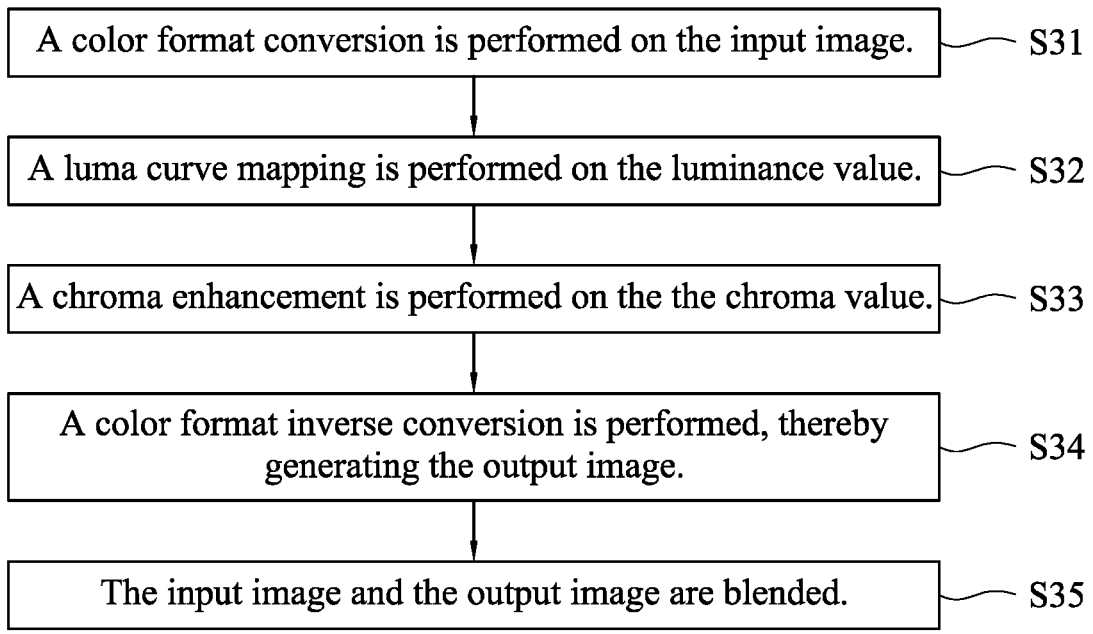
FIG. 3 illustrates a flow chart of a method for adjusting the DCC of the input image according to the embodiment of the present invention.

FIG. 3 illustrates a flow chart of a method for adjusting the DCC of the input image according to the embodiment of the present invention. In step S31, a color format conversion is performed on the input image. In the embodiment of the present invention, the color format conversion of step S31 is to convert the RGB color format to the YUV color format, but the present invention is not limited thereto. In step S32, a luma curve mapping is performed on the Y value (i.e., the luminance value) of the color value corresponding to the pixels of each of the blocks of the input image according to the weight value, the coordinate information, and the color information corresponding to each of the blocks.

In step S33, a chroma enhancement is performed on the U value and the V value (i.e., the chroma value) of the color value corresponding to the pixels of each of the blocks of the input image based on a result of the luma curve mapping. In step S34, a color format inverse conversion is performed based on a result of the chroma enhancement, thereby generating the output image. In the embodiment of the present invention, the color format inverse conversion in step S34 is opposite to the color format conversion in step S31, for example, the color format inverse conversion is to convert the YUV color format to the RGB color format, but the present invention is not limited thereto.

In step S35, the input image and the output image are blended according to the weight value, the coordinate information, and the color information corresponding to each of the blocks, so that the color of the output image and the color of the input image are not differ too much to cause negative side effect. The purpose of step S35 is to protect several specific blocks of the output image, so that the color of output image can be more natural.

In the embodiment of the present invention, it is noted that with respect to a degree of adjustment of the DCC of each of the blocks of the input image, the center of each of the blocks of the input image is adjusted more than the edge of each of the blocks of the input image. In other words, the degree of adjustment of the DCC of the center of each of the blocks of the input image is highest, and the degree of adjustment is decreased from the center of each of the blocks of the input image toward the edge of each of the blocks of the input image.

Figure 4:
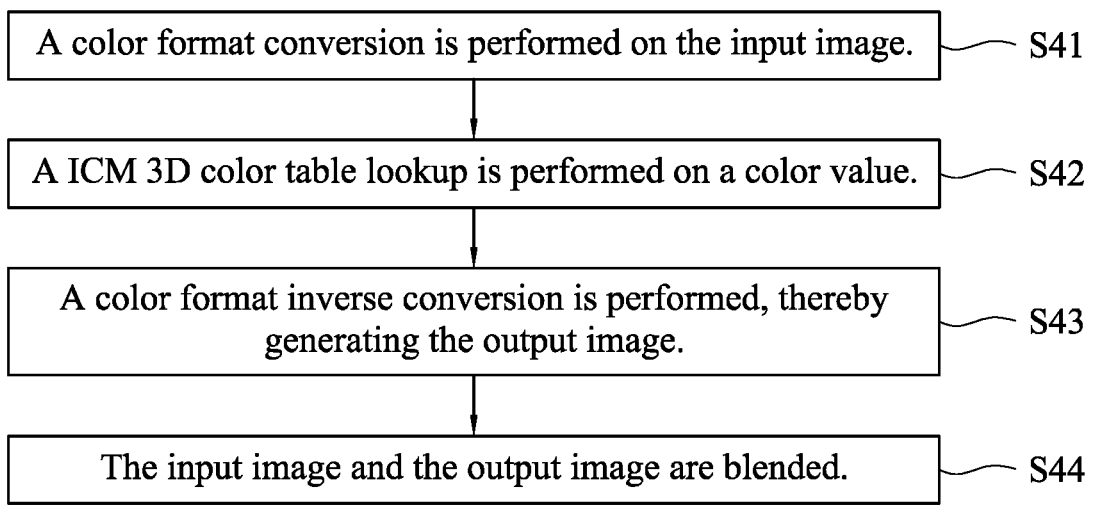
FIG. 4 illustrates a flow chart of a method for adjusting the ICM of the input image according to the embodiment of the present invention.

FIG. 4 illustrates a flow chart of a method for adjusting the ICM of the input image according to the embodiment of the present invention. In step S41, a color format conversion is performed on the input image. In the embodiment of the present invention, the color format conversion of step S41 is to convert the RGB color format to the HSI color format, but the present invention is not limited thereto. In step S42, a ICM 3D color table lookup is performed on a color value corresponding to the pixels of each of the blocks of the input image according to the weight value, the coordinate information, and the color information corresponding to each of the blocks. In step S43, a color format inverse conversion is performed based on a result of the ICM 3D color table lookup, thereby generating the output image. In the embodiment of the present invention, the color format inverse conversion in step S43 is opposite to the color format conversion in step S41, for example, the color format inverse conversion is to convert the HSI color format to the RGB color format, but the present invention is not limited thereto.

In step S44, the input image and the output image are blended according to the weight value, the coordinate information, and the color information corresponding to each of the blocks, so that the color of the output image and the color of the input image are not differ too much to cause negative side effect. The purpose of step S44 is to protect several specific blocks of the output image, so that the color of output image can be more natural.

In the embodiment of the present invention, it is noted that with respect to a degree of adjustment of the ICM of each of the blocks of the input image, the center of each of the blocks of the input image is adjusted more than the edge of each of the blocks of the input image. In other words, the degree of adjustment of the ICM of the center of each of the blocks of the input image is highest, and the degree of adjustment is decreased from the center of each of the blocks of the input image toward the edge of each of the blocks of the input image.

Figure 5:
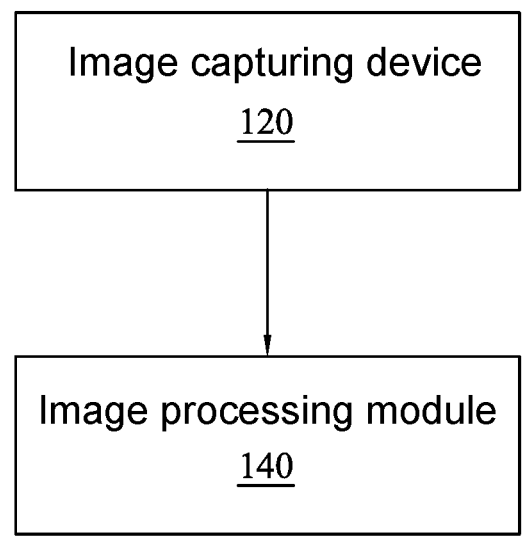
FIG. 5 illustrates a block diagram of an image adjusting device according to the embodiment of the present invention.

FIG. 5 illustrates a block diagram of an image adjusting device 100 according to the embodiment of the present invention. The image adjusting device 100 includes an image capturing device 120 and an image processing module 140. The image capturing device 120 is configured to capture an input image. The image processing module 140 is electrically connected to the image capturing device 120. The image processing module is configured to perform the image adjusting method as discussed in FIGS. 1-4. The descriptions of the image adjusting method which is performed by the image processing module 140 are already described with respect to FIGS. 1-4, and are not repeated here to avoid duplicity.

From the above description, the present invention provides an image adjusting method. The image adjusting method detects objects in an input image and classifies the objects through a deep learning model, and then adjusts at least one of the sharpness, dynamic contrast control (DCC), and independent color management (ICM) of the input image according to a result of classification and the information of the input image, thereby generating the output image. The present invention provides a more flexible image adjusting method to improve the visual quality of the image.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An image adjusting method, comprising:
   detecting objects in an input image and classifying the objects through a deep learning model, thereby obtaining a plurality of categories included in the input image, a weight value corresponding to each of the categories, and a plurality of blocks of the input image corresponding to each of the categories;
   obtaining a color information and a coordinate information of each of the blocks; and
   adjusting at least one of the sharpness, dynamic contrast control (DCC), and independent color management (ICM) of each of the blocks of the input image according to the weight value, the coordinate information, and the color information corresponding to each of the blocks, thereby generating an output image.

2. The image adjusting method of claim 1,
   wherein the color information of each of the blocks corresponds to a color value which appears most often among a plurality of color values of a plurality of pixels of each of the blocks;
   wherein the coordinate information of each of the blocks corresponds to a coordinate value of a top-left corner of each of the blocks and a coordinate value of a bottom-right corner of each of the blocks.

3. The image adjusting method of claim 2, wherein regarding adjusting the sharpness of each of the blocks of the input image, the image adjusting method further comprises:
   performing a color format conversion on the input image;
   performing an image feature classification on the blocks of the input image;
   performing a gain mapping based on a result of the image feature classification;
   performing a sharpness process on a first luminance value corresponding to the pixels of each of the blocks of the input image, thereby obtaining a second luminance value corresponding to the pixels of each of the blocks of the input image;
   blending the first luminance value and the second luminance value corresponding to the pixels of each of the blocks of the input image according to a result of the gain mapping, the weight value, the coordinate information, and the color information corresponding to each of the blocks, the corresponding to each of the blocks, thereby obtaining a third luminance value corresponding to the pixels of each of the blocks of the input image;
   performing a chroma process on a first chroma value corresponding to the pixels of each of the blocks of the input image, thereby obtaining a second chroma value corresponding to the pixels of each of the blocks of the input image; and performing a color format inverse conversion on the third luminance value and the second chroma value corresponding to the pixels of each of the blocks of the input image, thereby generating the output image.

4. The image adjusting method of claim 3, wherein regarding adjusting the sharpness of each of the blocks of the input image, the image adjusting method further comprises:
after performing the color format inverse conversion, blending the input image and the output image according to the weight value, the coordinate information, and the color information corresponding to each of the blocks, so that the color of the output image and the color of the input image are not differ too much to cause negative side effect.

5. The image adjusting method of claim 3, wherein the image feature classification is configured to classify each of the blocks of the input image according to a flat portion, an edge portion, and a texture portion.

6. The image adjusting method of claim 2, wherein regarding adjusting the DCC of each of the blocks of the input image, the image adjusting method further comprises:
performing a color format conversion on the input image;
performing a luma curve mapping on a luminance value corresponding to the pixels of each of the blocks of the input image according to the weight value, the coordinate information, and the color information corresponding to each of the blocks;
performing a chroma enhancement on a chroma value corresponding to the pixels of each of the blocks of the input image based on a result of the luma curve mapping; and
performing a color format inverse conversion based on a result of the chroma enhancement, thereby generating the output image.

7. The image adjusting method of claim 6, wherein regarding adjusting the DCC of each of the blocks of the input image, the image adjusting method further comprises:
after performing the color format inverse conversion, blending the input image and the output image according to the weight value, the coordinate information, and the color information corresponding to each of the blocks, so that the color of the output image and the color of the input image are not differ too much to cause negative side effect.

8. The image adjusting method of claim 1, wherein regarding adjusting the ICM of each of the blocks of the input image, the image adjusting method further comprises:
performing a color format conversion on the input image;
performing a ICM 3D color table lookup on a color value corresponding to a plurality of pixels of each of the blocks of the input image according to the weight value, the coordinate information, and the color information corresponding to each of the blocks; and
performing a color format inverse conversion based on a result of the ICM 3D color table lookup, thereby generating the output image.

9. The image adjusting method of claim 8, wherein regarding adjusting the ICM of each of the blocks of the input image, the image adjusting method further comprises:
after performing the color format inverse conversion, blending the input image and the output image according to the weight value, the coordinate information, and the color information corresponding to each of the blocks, so that the color of the output image and the color of the input image are not differ too much to cause negative side effect.

10. The image adjusting method of claim 1, wherein with respect to a degree of adjustment of at least one of the sharpness, the DCC, and the ICM of each of the blocks of the input image, the center of each of the blocks of the input image is adjusted more than the edge of each of the blocks of the input image.

11. An image adjusting device, comprising:
an image capturing device configured to capture an input image; and
an image processing module electrically connected to the image capturing device, wherein the image processing module is configured to perform the following steps:
detecting objects in the input image and classifying the objects through a deep learning model, thereby obtaining a plurality of categories included in the input image, a weight value corresponding to each of the categories, and a plurality of blocks of the input image corresponding to each of the categories;
obtaining a color information and a coordinate information of each of the blocks; and
adjusting at least one of the sharpness, dynamic contrast control (DCC), and independent color management (ICM) of each of the blocks of the input image according to the weight value, the coordinate information, and the color information corresponding to each of the blocks, thereby generating an output image.

12. The image adjusting device of claim 11,
wherein the color information of each of the blocks corresponds to a color value which appears most often among a plurality of color values of a plurality of pixels of each of the blocks;
wherein the coordinate information of each of the blocks corresponds to a coordinate value of a top-left corner of each of the blocks and a coordinate value of a bottom-right corner of each of the blocks.

13. The image adjusting device of claim 12, wherein regarding adjusting the sharpness of each of the blocks of the input image, wherein the image processing module is further configured to perform the following steps:
performing a color format conversion on the input image;
performing an image feature classification on the blocks of the input image;
performing a gain mapping based on a result of the image feature classification;
performing a sharpness process on a first luminance value corresponding to the pixels of each of the blocks of the input image, thereby obtaining a second luminance value corresponding to the pixels of each of the blocks of the input image;
blending the first luminance value and the second luminance value corresponding to the pixels of each of the blocks of the input image according to a result of the gain mapping, the weight value, the coordinate information, and the color information corresponding to each of the blocks, the corresponding to each of the blocks, thereby obtaining a third luminance value corresponding to the pixels of each of the blocks of the input image;
performing a chroma process on a first chroma value corresponding to the pixels of each of the blocks of the input image, thereby obtaining a second chroma value corresponding to the pixels of each of the blocks of the input image; and
performing a color format inverse conversion on the third luminance value and the second chroma value corresponding to the pixels of each of the blocks of the input image, thereby generating the output image.

14. The image adjusting device of claim 13, wherein regarding adjusting the sharpness of each of the blocks of the input image, wherein the image processing module is further configured to perform the following step:
- after performing the color format inverse conversion, blending the input image and the output image according to the weight value, the coordinate information, and the color information corresponding to each of the blocks, so that the color of the output image and the color of the input image are not differ too much to cause negative side effect.

15. The image adjusting device of claim 13, wherein the image feature classification is configured to classify each of the blocks of the input image according to a flat portion, an edge portion, and a texture portion.

16. The image adjusting device of claim 12, wherein regarding adjusting the DCC of each of the blocks of the input image, wherein the image processing module is further configured to perform the following steps:
- performing a color format conversion on the input image;
- performing a luma curve mapping on a luminance value corresponding to the pixels of each of the blocks of the input image according to the weight value, the coordinate information, and the color information corresponding to each of the blocks;
- performing a chroma enhancement on a chroma value corresponding to the pixels of each of the blocks of the input image based on a result of the luma curve mapping; and
- performing a color format inverse conversion based on a result of the chroma enhancement, thereby generating the output image.

17. The image adjusting device of claim 16, wherein regarding adjusting the DCC of each of the blocks of the input image, wherein the image processing module is further configured to perform the following steps:
- after performing the color format inverse conversion, blending the input image and the output image according to the weight value, the coordinate information, and the color information corresponding to each of the blocks, so that the color of the output image and the color of the input image are not differ too much to cause negative side effect.

18. The image adjusting device of claim 11, wherein regarding adjusting the ICM of each of the blocks of the input image, wherein the image processing module is further configured to perform the following steps:
- performing a color format conversion on the input image;
- performing a ICM 3D color table lookup on a color value corresponding to a plurality of pixels of each of the blocks of the input image according to the weight value, the coordinate information, and the color information corresponding to each of the blocks; and
- performing a color format inverse conversion based on a result of the ICM 3D color table lookup, thereby generating the output image.

19. The image adjusting device of claim 18, wherein regarding adjusting the ICM of each of the blocks of the input image, wherein the image processing module is further configured to perform the following step:
- after performing the color format inverse conversion, blending the input image and the output image according to the weight value, the coordinate information, and the color information corresponding to each of the blocks, so that the color of the output image and the color of the input image are not differ too much to cause negative side effect.

20. The image adjusting device of claim 11, wherein with respect to a degree of adjustment of at least one of the sharpness, the DCC, and the ICM of each of the blocks of the input image, the center of each of the blocks of the input image is adjusted more than the edge of each of the blocks of the input image.

* * * * *